US006868313B2

(12) United States Patent
Koljonen

(10) Patent No.: US 6,868,313 B2
(45) Date of Patent: Mar. 15, 2005

(54) AUTOMOBILE LICENSE TAG SCANNING SYSTEM

(76) Inventor: Reino Koljonen, 811 S. G St., Lake Worth, FL (US) 33460

(*) Notice: Subject to any disclaimer, the term of this patent is extended or adjusted under 35 U.S.C. 154(b) by 0 days.

(21) Appl. No.: 10/638,240

(22) Filed: Aug. 8, 2003

(65) Prior Publication Data

US 2005/0033482 A1 Feb. 10, 2005

(51) Int. Cl.[7] .................................................. G06F 7/00

(52) U.S. Cl. ............................... 701/1; 701/24; 701/29; 701/36; 340/991

(58) Field of Search ................................. 701/1, 24–25, 701/29, 33, 36; 340/906, 991, 993

(56) References Cited

U.S. PATENT DOCUMENTS 4,796,191 A * 1/1989 Honey et al. ............... 701/217
5,825,286 A * 10/1998 Coulthard ................... 340/447
6,052,631 A * 4/2000 Busch et al. .................. 701/29
2002/0198660 A1 * 12/2002 Lutter et al. ................ 701/301

* cited by examiner

*Primary Examiner*—Gertrude A. Jeanglaude
(74) *Attorney, Agent, or Firm*—Robert M. Downey, PA

(57) ABSTRACT

A system for reading license tags on vehicles enables a law enforcement officer to rapidly identify stolen tags, stolen vehicles and expired vehicle registrations. According to the system, law enforcement vehicles are provided with a scanner which is optimally positioned for receiving data stored in a chip which is carried in the annual registration renewal decal attached to the license tag on all automobiles. The scanner communicates with an onboard computer for processing the data captured from one or more automobiles positioned forward of the law enforcement vehicle, either in the same lane or adjacent lanes. The onboard computer communicates with a central law enforcement database server via wireless transmission, for instance by cellular communication and/or GPS satellite communication. Data captured from the license tag decals is matched with records stored on the central database to determine vehicle registration status of all automobiles within scanning view of the law enforcement vehicle. Vehicles in violation are instantly identified and the law enforcement officer is alerted with the use of a visual display and audible alarms.

12 Claims, 2 Drawing Sheets

AUTOMOBILE LICENSE TAG SCANNING SYSTEM

BACKGROUND OF THE INVENTION

1. Field of the Invention

The present invention is directed to a vehicle identification system for law enforcement and, more particularly, to a system for reading license tags on vehicles to enable law enforcement agencies to identify stolen license tags, stolen vehicles and expired vehicle registrations.

2. Discussion of the Related Art

The number of vehicles stolen in the United States each year is appalling and continues to increase at an alarming rate. According to a vehicle theft rate study by the National Insurance Crime Bureau (NICB) the number of vehicles stolen in major cities, as well as the vehicle theft rate (i.e. the number of vehicle thefts reported per 100,000 in population) has increased from 1999 to 2001. Most alarming is the actual number of vehicle thefts reported in major cities. For instance, in the year 2001, there were 67,909 vehicles reported stolen in the greater Los Angeles/Long Beach area of Southern California. In that same year, 44,922 vehicles were reported stolen in Chicago, Ill., while 35,161 vehicle thefts were reported in Phoenix, Ariz. and 23,610 vehicle thefts were reported in Miami, Fla. Other major cities had theft numbers of the same general magnitude.

The vast number of vehicles reported stolen in any particular city or municipality makes it extremely difficult for law enforcement agencies to quickly identify a stolen vehicle. Every day, police in all cities and towns of the United States drive past stolen vehicles on the road. However, because police have limited resources to identify the stolen vehicles, in most cases the stolen vehicle goes unnoticed. When a stolen vehicle is identified, it is usually as a result of a traffic violation, commission of a crime or other suspicious activity which prompts a police officer to call in the vehicle's tag number and vehicle identification number to a central database. Unfortunately, most stolen vehicles do not remain on the road for a long enough time to be identified by the methods presently employed by law enforcement agencies. Typically, stolen vehicles are dismantled at "chop shops" and the parts are sold individually. In other instances, stolen vehicles are shipped to other countries and never recovered. And, it is generally accepted in the law enforcement community that, unless a stolen vehicle is recovered within 24 hours of theft, it is highly unlikely that the stolen car will ever be found. While vehicle theft recovery systems are presently in use, most require a significant investment by the vehicle owner to have a transmitting device installed in a secret location on the vehicle. Systems of this nature require continual payment of monthly fees. As a result, the expense of these systems is only practical and affordable to drivers of high-end; luxury vehicles. For this reason, most cars on the road today are not outfitted with a vehicle theft recovery system.

While the number of vehicles stolen each year is staggering, the number of vehicles driving with expired registrations is far greater in number. Certainly, an expired registration is a far less serious matter than vehicle theft. Nonetheless, enforcing vehicle registration renewal is a difficult task for law enforcement and motor vehicle agencies in each state. Presently, law enforcement officers are required to visually identify expired vehicle registrations by viewing decals attached to the rear license tag. In most states, a vehicle registration renewal decal is affixed to the tag on the rear bumper of the vehicle, with an indication of the expiration date according to the month and year of expiration. However, due to the small size of the registration decals, it is difficult for a police officer trailing a moving vehicle to read the expiration date. As a matter of practice, most police officers will routinely read the registration decal on the car in front of them while they are stopped at a traffic light or stop sign. Using this method, police officers are only able to check the vehicle registration decals on a small percentage of vehicles on the road. Moreover, there is presently no means for a police officer to quickly identify whether the registration renewal decal or license tag has been removed or stolen from another vehicle.

Accordingly, in view of the above-noted problems concerning identification of stolen vehicles, license tag and decal theft and determining vehicle registration expiration, there remains an urgent need in the law enforcement community for a computerized scanning system which enables rapid capture and processing of vehicle registration data on multiple vehicles in the direct forward proximity of a law enforcement vehicle.

OBJECTS AND ADVANTAGES OF THE INVENTION

With the foregoing in mind, it is a primary object of the present invention to provide a system for reading license tags on vehicles for enabling law enforcement personnel to rapidly identify stolen tags, stolen vehicles and expired vehicle registrations.

It is a further object of the present invention to provide a system which includes a scanner device installed in a law enforcement vehicle, and wherein the scanner device is adapted to read and/or receive data stored in a chip embedded within the vehicle registration renewal decal on a license tag of the vehicle.

It is still a further object of the present invention to provide a system for reading license tags on vehicles in order to rapidly identify stolen tags, stolen vehicles and expired vehicle registrations, and wherein the system includes a scanner device installed in law enforcement vehicles which reads and/or receives data stored on a chip in the vehicle registration renewal decal on a license tag of one or more vehicles in the forward proximity of the law enforcement vehicle, and further wherein the scanner communicates with an onboard computer in the police vehicle and a remote central law enforcement database.

It is still a further object of the present invention to provide a system for use in law enforcement vehicles for rapidly obtaining vehicle registration data from automobiles in close proximity to the law enforcement vehicle, including: the make, model and year of the vehicle; the vehicle identification number (VIN); the status of payment of registration renewal fees indicating whether the vehicle registration is active or expired; the vehicle owner's name and driver license number; and the vehicle owner's telephone number, including a cellular telephone number.

These and other objects and advantages of the present invention are more readily apparent with reference to the following detailed description and the accompanying drawings.

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENT

Figure 1:
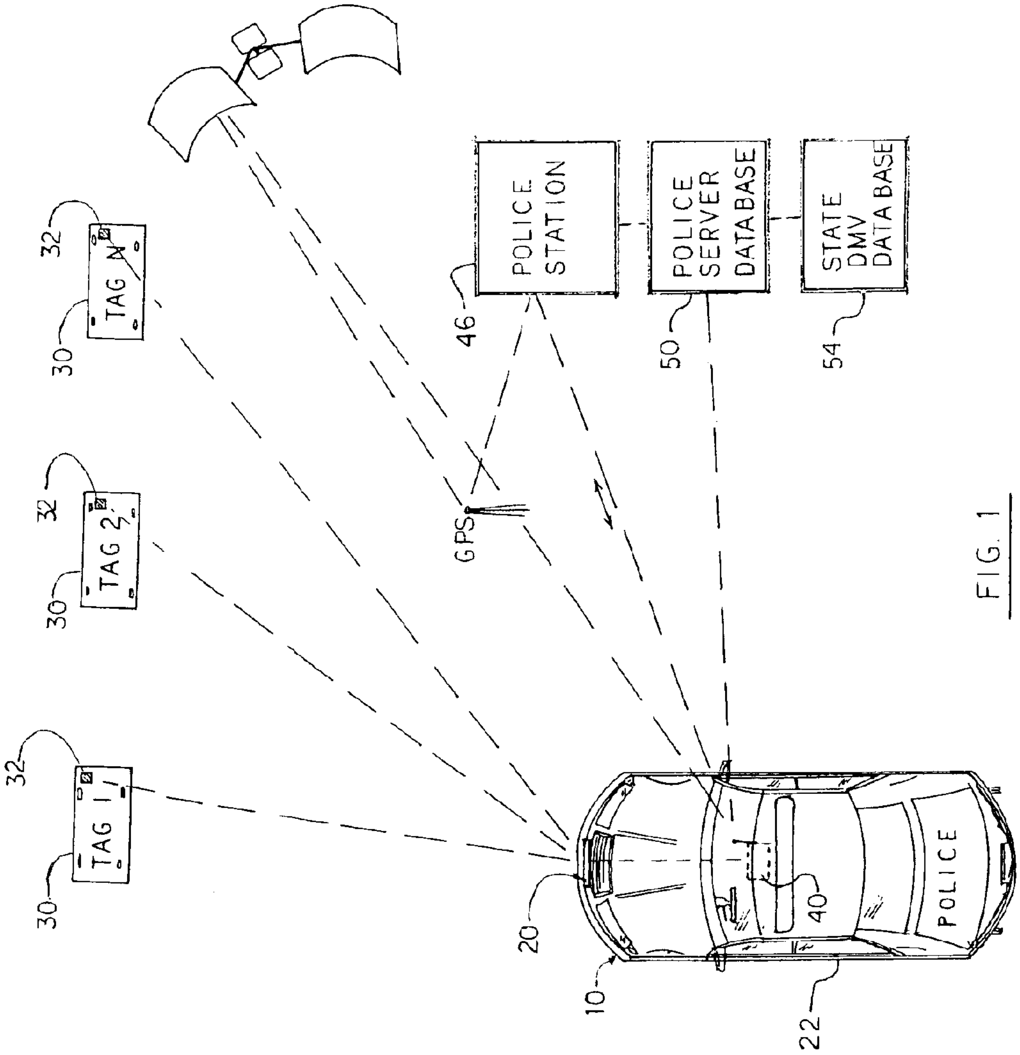
FIG. 1 is a schematic diagram showing the primary components of the system of the present invention, according to a preferred embodiment thereof.
Figure 2:
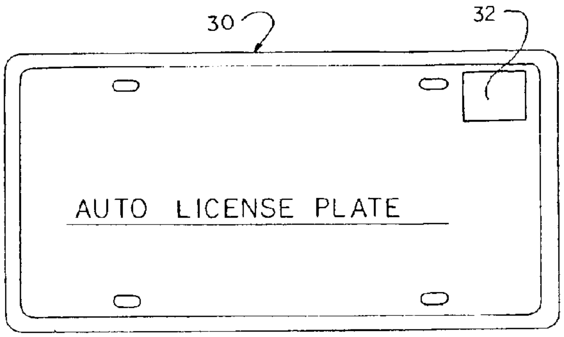
FIG. 2 is a top plan view of a typical automobile license plate (i.e. tag)
Figure 3:
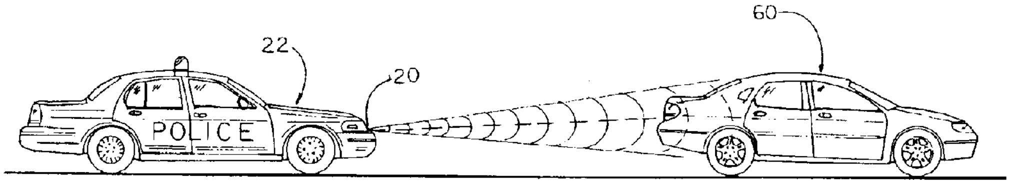
FIG. 3 is a side elevational view showing a police vehicle provided with the system of the present invention and scanning the license tag on the rear of an automobile in front of the police vehicle.

Referring to the several views of the drawings, and initially FIG. 1, the automobile license tag scanning system of the present invention is shown in accordance with a preferred embodiment and is generally indicated as 10.

In a preferred embodiment, the system includes a scanner device 20 which is installed in law enforcement vehicles. The scanner device 20 is preferably positioned at an optimal viewing orientation for obtaining data from the license tags 30 on automobiles driving in front of the police vehicle, either directly in front (i.e. the same lane) or adjacent lanes (left or right of the police vehicle's lane). More specifically, the scanner 20 is adapted to obtain vehicle registration data encoded in a vehicle registration renewal decal 32 attached to the license tag 30 on the rear of all automobiles. In the preferred embodiment, a microchip is embedded within the vehicle registration renewal decal 32 and is programmed with all relevant registration data pertaining to the automobile and automobile owner.

According to the system of the present invention, when an automobile owner pays each year to renew the vehicle registration for the automobile, a new encoded vehicle registration renewal decal is delivered to the automobile owner. The encoded decal 32 includes updated data to verify that the automobile owner has paid the annual fee for registration renewal. The vehicle registration data which is stored in the memory of a microchip embedded within the decal 32 may include the following: the make, model and year of the automobile; the vehicle identification number (VIN); the status of payment of registration renewal fees indicating whether the vehicle registration is active or expired; the vehicle owner's name and driver license number; and the vehicle owner's telephone number, which may include a cellular telephone number. When the automobile owner receives the vehicle registration renewal decal 32 each year, the old decal is removed and the new decal is affixed to a designated area (e.g. the top right corner) of the license tag mounted on the rear of the automobile.

As illustrated in FIG. 1, the scanner is linked to an onboard computer 40 within the law enforcement vehicle. In the preferred embodiment, the onboard computer 40 communicates with a local police station via a wireless communication link such as a cellular telephone communication link or a GPS satellite link. The onboard computer 40 may also communicate with a central law enforcement database via a remote computer server. This communication link may be provided through the police station or through a direct wireless communication link between the onboard computer 40 and the server 50. The remote server 50 may further be linked to other databases, including the State Department of Motor Vehicles.

Figure 4:
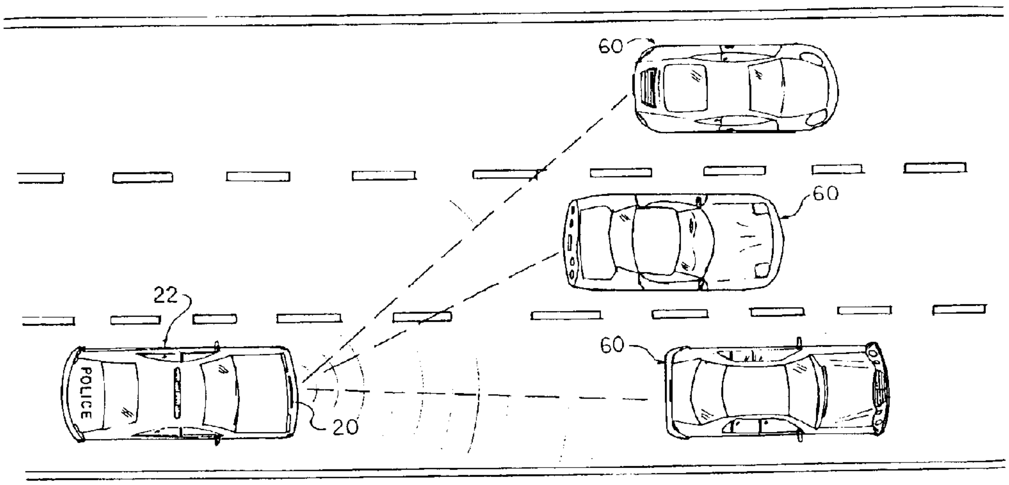
FIG. 4 is a top plan view showing a police vehicle provided with the system of the present invention and scanning the license tags of multiple automobiles in separate lanes forward of the police vehicle.

In use, the scanner on the police vehicle constantly reads and captures data from the encoded vehicle registration renewal decals on the license tags of automobiles in the direct forward proximity of the police vehicle. The scanner may simultaneously capture data from multiple automobiles, both directly forward of the police vehicle, as well as in adjacent lanes either to the left of the police vehicle or to the right of the police vehicle as illustrated in FIG. 4. Reading and capturing the data from the vehicle registration renewal decal 32 may involve sending a wake-up signal by the scanner which triggers temporary activation of a transmitter chip carried in the vehicle registration renewal decal 32. Upon activation or "wake-up" of the chip, triggered by the scanner, the encoded vehicle registration data is transmitted to the scanner. The scanner captures the vehicle registration data from each automobile registration renewal decal and delivers it to the onboard computer for processing. The onboard computer then communicates with the police station and/or the remote law enforcement database to obtain updated data relevant to each scanned decal. This updated data may include recent reports of a stolen tag, decal or vehicle. By matching the data from the central law enforcement database, as well as other remote databases (e.g. the State Department of Motor Vehicle database) with the data captured by the scanner device, a stolen vehicle, stolen tag or decal, or expired vehicle registration on any automobile in the forward proximity of the police vehicle can be instantly identified. Upon identifying a problem, the computer activates a display in the police vehicle which indicates the location of the suspect automobile relative to the police vehicle, including information identifying whether the vehicle is stolen, the tag is stolen or whether the vehicle registration has expired. The police officer in the police vehicle can then quickly order the identified vehicle to pull over for ticketing or arrest. Alternatively, the vehicle owner's telephone number may be displayed to the police officer, allowing the police officer to call the vehicle owners cellular phone so that the police officer can communicate with the vehicle owner. If the vehicle owner is driving the identified automobile, the police officer can instruct the owner to pull over, while explaining that the vehicle registration has expired. Otherwise, if it is determined that the identified automobile is being driven by an unauthorized person, the police officer will know to take caution in attempting to apprehend the driver of the automobile.

While the instant invention has been shown and described in accordance with a preferred and practical embodiment thereof, it is recognized that departures from the instant disclosure are contemplated within the spirit and scope of the present invention.

What is claimed is:

1. A system for obtaining information relevant to an automobile comprising:
   - a receiver device carried on a second automobile for capturing encoded data carried on a first automobile;
   - a computer device carried on said second automobile communicating with said receiver device for processing the captured encoded data;
   - a display for displaying information acquired from the processed encoded data; and
   - said encoded data being carried on a decal attached to a license tag on an exterior of said first automobile.

2. The system as recited in claim 1 further comprising:

a remote computer database communicating with said computer device.

3. The system as recited in claim 1 further comprising:

a transmitter device carried by said decal for transmitting the encoded data to said receiver device on the second automobile.

4. The system as recited in claim 1 wherein said receiver device comprises a scanner device for simultaneously capturing encoded data from a plurality of independent automobiles.

5. The system as recited in claim 4 wherein said computer device is structured and disposed to simultaneously process the encoded data captured from the plurality of independent automobiles.

6. The system as recited in claim 5 wherein the communication between said remote computer database and said computer device is by wireless means.

7. The system as recited in claim 6 wherein the communication between said remote computer database and the computer device on the second automobile is by global position satellite communication.

8. The system as recited in claim 6 wherein the communication between said remote computer database and the computer device on the second automobile is by wireless cellular telephone communication.

9. A system for obtaining information from at least one secondary automobile in the vicinity of a primary automobile, said system comprising:

a receiver device carried on the primary automobile for capturing encoded data carried on the at least one secondary automobile;

a computer device communicating with said receiver device for processing the captured encoded data;

a display carried in the primary automobile for displaying information acquired from the processed encoded data; and wherein said encoded data is carried on a decal attached to a license tag on an exterior of the at least one secondary automobile.

10. The system as recited in claim 9 further comprising:

a remote computer database communicating with said computer device.

11. The system as recited in claim 9 further comprising:

a transmitter device carried by said decal for transmitting the encoded data to said receiver device on the primary automobile.

12. The device as recited in claim 9 wherein said receiver device comprises a scanner device for simultaneously capturing encoded data from a plurality of the secondary automobiles.

* * * * *